July 4, 1961 W. D. BROWN 2,990,631
TRENCHING MACHINE
Original Filed Nov. 25, 1955 4 Sheets-Sheet 1
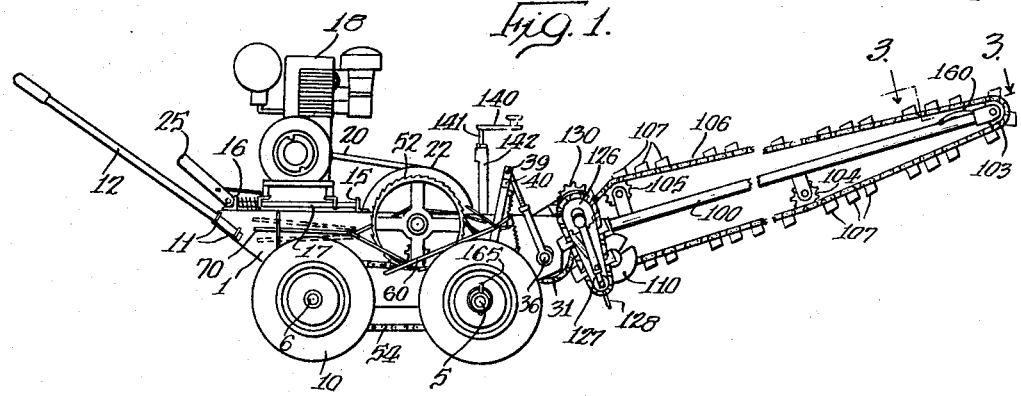
Fig. 1.
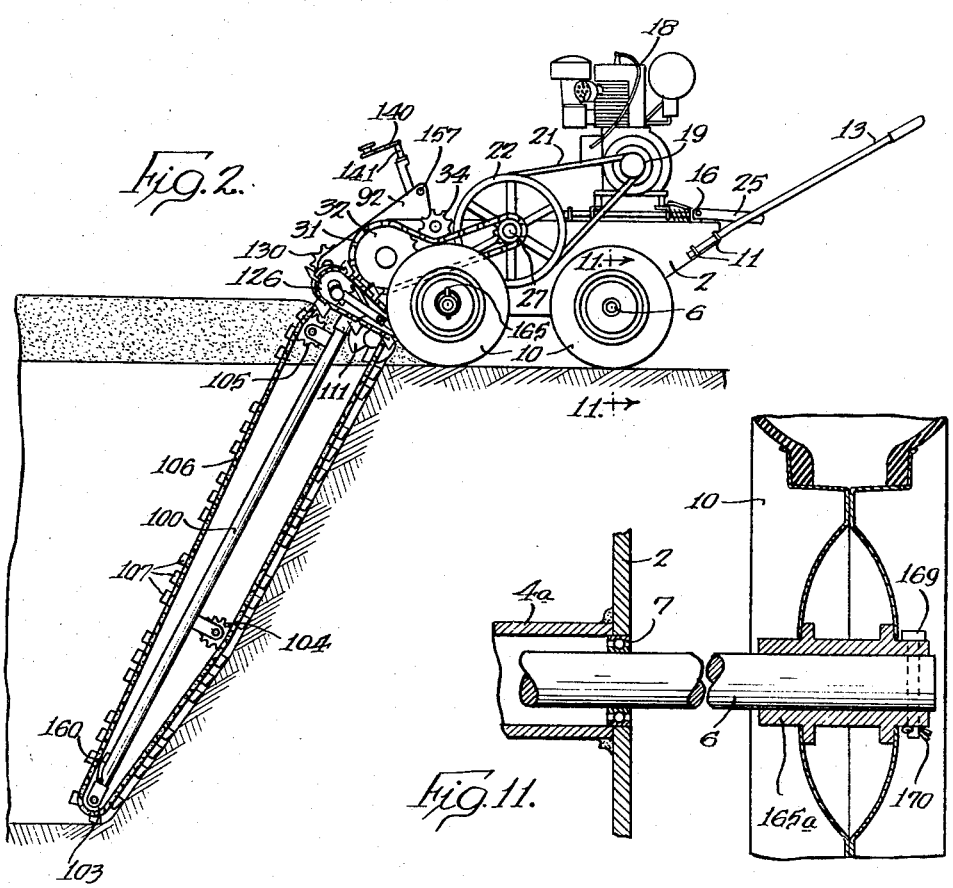
Fig. 2.
Fig. 11.
INVENTOR.
William Delbert Brown
BY Schroeder, Hofgren,
Brady & Wegner
Attys July 4, 1961 W. D. BROWN 2,990,631
TRENCHING MACHINE
Original Filed Nov. 25, 1955 4 Sheets-Sheet 2
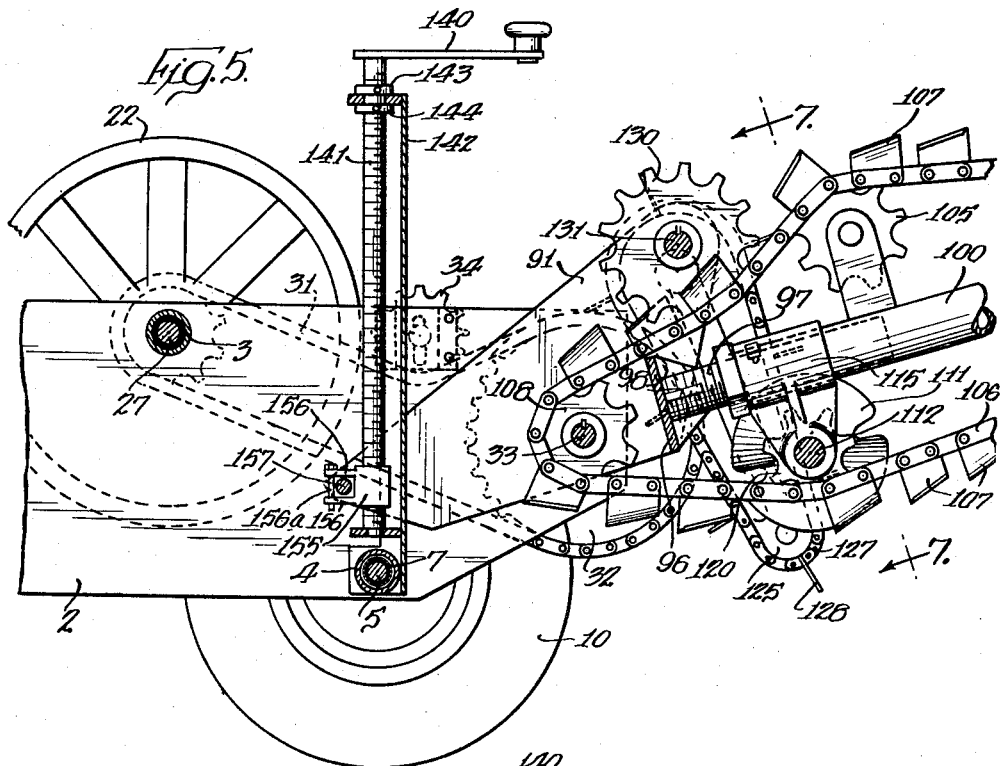
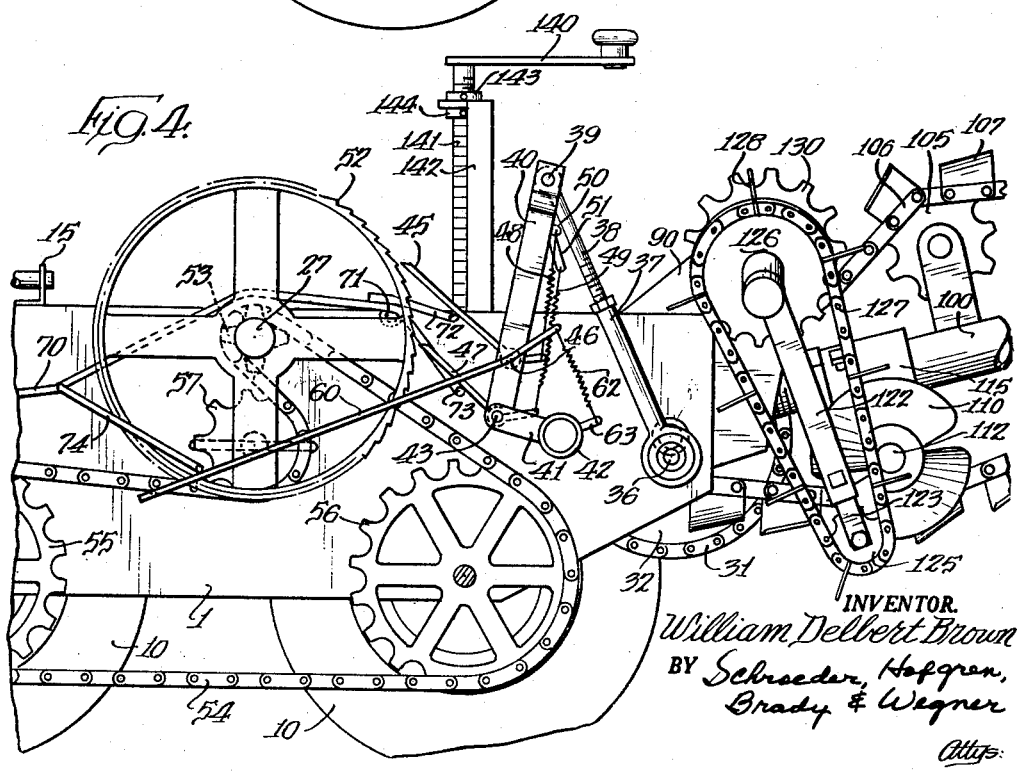
INVENTOR.
William Delbert Brown
BY Schroeder, Hofgren,
Brady & Wegner
Attys.

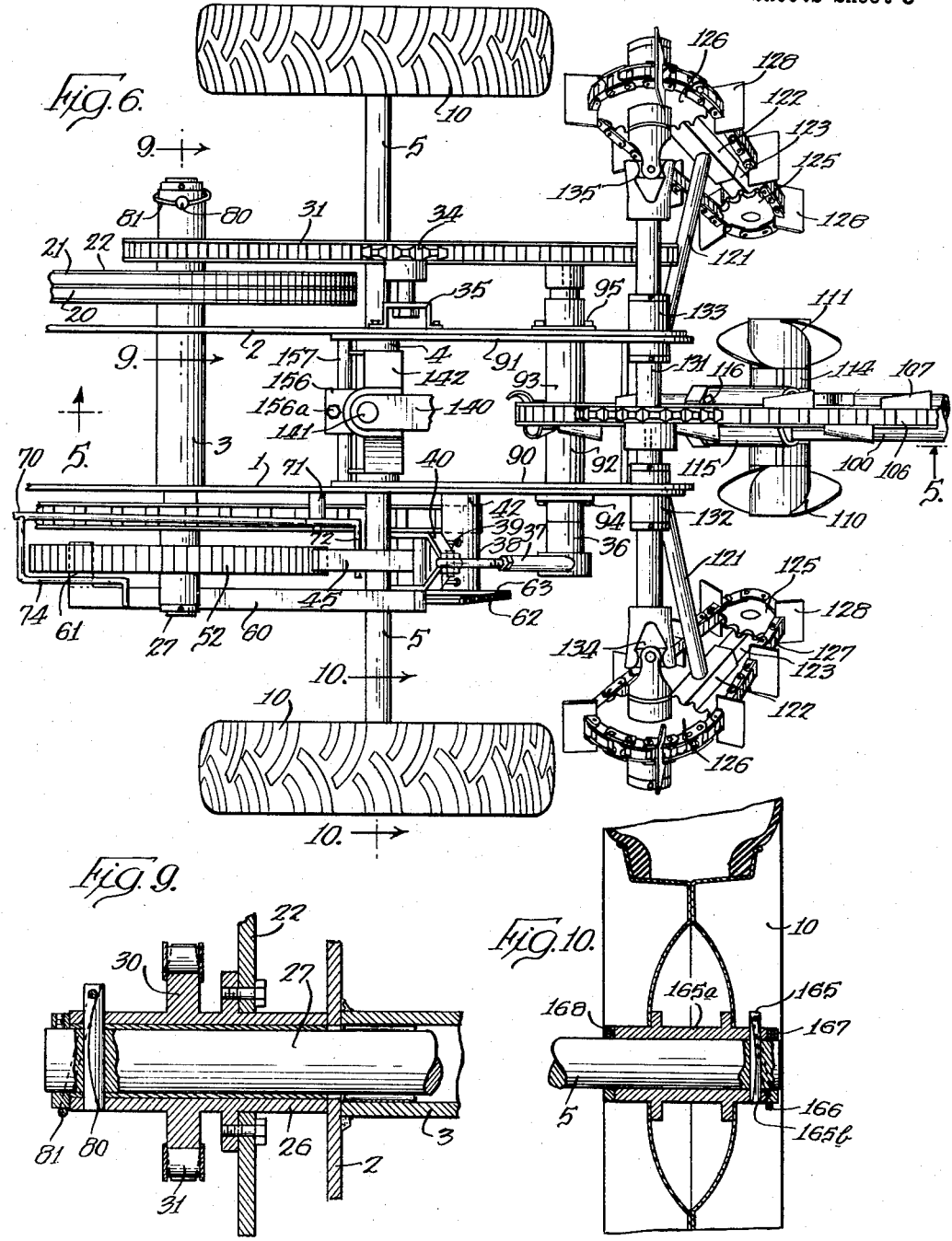

July 4, 1961
W. D. BROWN
2,990,631
TRENCHING MACHINE
Original Filed Nov. 25, 1955
4 Sheets-Sheet 4
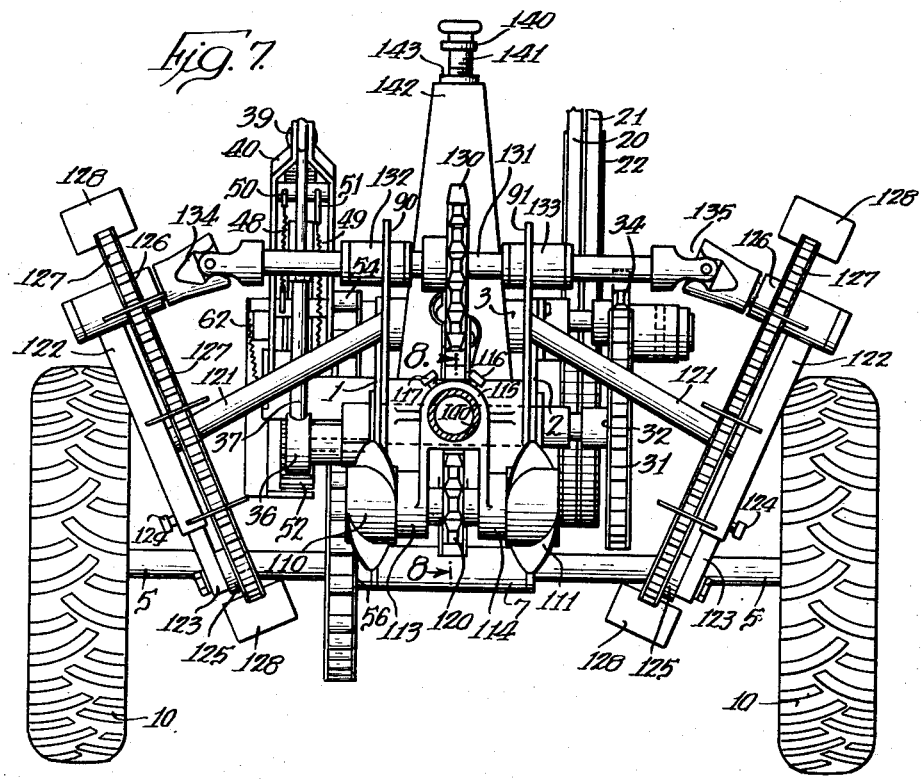
INVENTOR.
William Delbert Brown
BY Schroeder, Hofgren,
Brady & Wegner
Attys.

United States Patent Office 2,990,631
Patented July 4, 1961

2,990,631
TRENCHING MACHINE
William Delbert Brown, Woodbine, Iowa
Original application Nov. 25, 1955, Ser. No. 548,838, now Patent No. 2,828,557, dated Apr. 1, 1958. Divided and this application June 12, 1957, Ser. No. 665,171
8 Claims. (Cl. 37—86)

This invention relates to a trenching machine and, more particularly, to a portable self-contained trenching machine which is of relatively simple construction.

In the past, trenching machines have been substantial devices and most commonly involved the use of some form of vehicle, such as a tractor or the like. As may be readily appreciated, this constituted a complex mechanism and, because of this, required a substantial investment.

An object of this invention is to provide a relatively simply constructed portable trenching machine which is entirely self-contained.

A further object of the invention is to provide a portable trenching machine having a power source carried thereon with common drive mechanism for moving the machine at a trenching rate when a trench is being dug or at a mobile rate when a trench is not being dug, said means including a drive pulley which may be directly connected to the drive for the wheels of the machine in mobile rate movement and may be indirectly connected to the wheels when in trenching rate movement.

Another object of the invention is to provide a portable trenching machine as defined in the preceding paragraph, wherein said drive shaft has a ratchet wheel and a drive sprocket secured thereto, an oscillating pawl carrier adjacent the ratchet wheel and having a drive pawl, a hold pawl positioned on said pawl carrier to have no throw when the carrier oscillates, a manually-operable control member pivotally mounted on the body for movement between a plurality of positions and having arms engageable with said pawls to permit both pawls to engage with the ratchet wheel or permit only the hold pawl to engage the ratchet wheel, or to hold both pawls away from the ratchet wheel and wherein another drive pawl may optionally be used with said first drive pawl so as to index the ratchet wheel in both directions of movement of the pawl carrier to double the trenching rate of machine movement, and another arm on the control member engageable with said second drive pawl to disengage said second drive pawl from the ratchet wheel whenever said first drive pawl is disengaged.

The objects of the invention generally set forth, together with other ancillary advantages, are attained by the construction and arrangement shown by way of illustration in the accompanying drawing, in which:

FIG. 1 is a side elevation of the portable trenching machine with the forward end thereof at the right of the figure and with boom up so as to permit mobile movement of the machine;

FIG. 2 is a side elevation of the machine and of the side opposite to that shown in FIG. 1 with the rear of the machine to the right of the figure and with the parts shown in trench cutting position;

FIG. 3 is a fragmentary enlarged plan view of the boom outer end with a portion of the cutter chain broken away;

FIG. 4 is a fragmentary enlarged side elevation similar to that of FIG. 1 with the nearest wheels removed;

FIG. 5 is a fragmentary enlarged vertical section taken along the line 5—5 in FIG. 6;

FIG. 6 is a fragmentary enlarged plan view of the trenching machine;

FIG. 7 is a generally vertical section on an enlarged scale taken along the line 7—7 in FIG. 5;

FIG. 8 is a fragmentary enlarged vertical section taken along the line 8—8 in FIG. 7;

FIG. 9 is an enlarged vertical section taken along the line 9—9 of FIG. 6;

FIG. 10 is an enlarged vertical section taken along the line 10—10 of FIG. 6; and FIG. 11 is a fragmentary enlarged vertical section taken along the line 11—11 in FIG. 2.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

As shown generally in FIGS. 1, 2 and 6, the portable trenching machine has a body formed of spaced-apart elongated side plates 1 and 2 which are interconnected by cross braces in the form of tubular rods. These cross braces are indicated at 3 and 4. The cross brace 4 receives a front axle 5, and a similar cross brace 4a receives a rear axle 6. These cross braces surround openings (not shown) in the side plates 1 and 2 and may be secured to the side plates by suitable means such as welding. The cross braces for the front and rear axles, one being shown at 4, form housings for bearings 7 (FIG. 5). A wheel 10 is mounted at the outer ends of each axle.

The rear ends of the side plates 1 and 2 have brackets 11 affixed to the outer sides thereof which slidably receive handles 12 and 13 and the handles may be removably connected to the body by suitable mechanisms such as cotter pins extended through the handle members.

A pair of brackets 15 and 16 extend transversely between the side plates 1 and 2 at their rear upper edges and have a pair of laterally-spaced rods 17 upon which a motor 18 may be slidably mounted. The motor 18 has a pair of drive pulleys, one of which is shown at 19, for driving belts 20 and 21 which drive a double-grooved pulley 22. A handle 25 is pivotally mounted on the bracket 16 and by connections to the motor mounting may be used to engage or disengage the drive to the pulley 22 by controlling the tightness of the belts 20 and 21.

The pulley 22, as shown in FIG. 9, is connected to a sleeve 26 rotatably mounted on a drive shaft 27 which extends through the cross brace 3. The sleeve 26 has a sprocket 30 formed integrally thereon which drives a chain 31 which is in driving engagement with a sprocket 32 fixed to another drive shaft 33 extending transversely of the body. An idler tensioning sprocket 34 is adjustably mounted on a bracket 35 fixed to the side plate 2.

The drive shaft 33 outboard of the side plate 1 has an eccentric pin 36 connected thereto which drives a crank rod formed of parts 37 and 38 which are adjustable with respect to each other. The upper end of the part 38 is connected by a pin 39 to a bifurcated pawl carrier 40 which is pivotally mounted at its lower end to a bracket 41 secured to a projection 42 on the side plate 1 by a pin 43. The pawl carrier has a first drive pawl 45 pivotally mounted on the pawl carrier 40 by a pin 46 and a hold pawl 47 pivotally mounted on the pin 43. A pair of springs 48 and 49 extend between lugs 50 and 51 on the pawl carrier, respectively, and ends of pawls 45 and 47, respectively, so as to urge the pawls toward a ratchet wheel 52 which is fixed to the drive shaft 27. A wheel drive sprocket 53 is formed integrally with the ratchet wheel 52 and drivingly engages a chain 54 which engages driven sprockets 55 and 56 on the axles 5 and 6, respectively An idler 57 adjustably mounted on the side plate 1 controls the tension on the chain 54.

A second drive pawl 60 extends rearwardly from and is mounted on the pivot pin 46 and has an inwardly-directed end 61 positioned for engagement with the ratchet wheel 52. The latter pawl is urged towards the ratchet wheel by a spring 62 connected between the pawl and a lug 63 formed on the projection 42.

The second drive pawl 60 is optionally usable when it is desired to double the trenching rate of movement for the machine since the ratchet wheel will be indexed by pawls in both directions of pawl carrier movement.

In normal operation, the drive shaft 33 through the crank rod causes oscillation of the pawl carrier 40 to impart a throw to the drive pawl 45 and also the second drive pawl 60, if it is used, so that, in one direction of movement the pawl 45 steps the ratchet wheel one tooth and in the other direction of pawl carrier movement the pawl 60 steps the ratchet wheel one tooth. The hold pawl 47 does not have any throw imparted thereto and only functions as a hold pawl to prevent retrograde movement of the ratchet wheel.

A manually operable control member 70 extends from a position adjacent the rear of the machine toward the front thereof and is pivoted on the side plate 1 at 71 and has the arms 72, 73 and 74 which control the positioning of the drive and hold pawls with respect to the ratchet wheel 52.

When the handle member 70 is in its uppermost position as shown in dotted lines in FIG. 1, the arms 72, 73 and 74 are positioned so that all three pawls or two, depending upon the optional use of drive pawl 60, may be urged into engagement with the ratchet wheel 52 by the springs 48, 49 and 62. In this position of the member 70, the machine will operate to produce a trenching rate of movement of the machine which is that rate of movement desired when forming a trench.

In the middle position of the handle 70, as shown in full lines in FIG. 1, the drive pawls 45 and 60 are held out of engagement with the ratchet wheel 52 but the arm 73 is so positioned that the hold pawl 47 may still engage the ratchet wheel. This position of the pawl mechanisms functions to lock the machine against movement when the trench cutting mechanism is lowered into the ground.

The lowest position of member 70 (FIGS. 1 and 4) results in additionally moving the hold pawl 47 out of engagement with the ratchet wheel 52 so that the pawls have no effect on the ratchet wheel 52 which permits the machine to move in a mobile rate of movement as caused by mechanism hereinafter described. The term "mobile rate of movement" is meant to mean a rate of movement greater than the "trenching rate of movement" and is a rate of movement desired when the machine is moved under its own power between cutting locations.

The mobile rate of movement for the machine is obtained by means of a pin 80 (FIG. 9) which extends through and connects the sleeve 26 to the drive shaft 27 so that the rotation of the pulley 22 is directly transmitted to the wheel drive sprocket 53 through the shaft 27. The pin 80 is held in connecting relation with sleeve 26 and shaft 27 by a spring clip 81 which surrounds the sleeve 26. It will be noted that the direction of movement imparted to the machine when in mobile drive with the pin 80 in use is opposite to that when the machine is in trenching rate of movement under operation of the pawl 45.

A pair of spaced-apart boom plates 90 and 91 lie adjacent the inner sides of the side plates 1 and 2 and are pivotally mounted on sleeves 92 and 93 which extend inwardly through the side plates and the boom plates. The sleeves 92 and 93 are secured to the outer sides of the side plates by bolts as indicated at 94 and 95 and from bearing supports for drive shaft 33. The boom plates 90 and 91 having a cross plate 96 extended therebetween and secured thereto which has a threaded stub shaft 97 secured thereto by a plurality of angle brackets 98. These parts may be suitably secured together as by welding.

A boom 100 in the form of a tubular rod is slidably mounted on the stub shaft 97 and keyed thereto as shown at 101 to prevent rotation of the boom with respect to the stub shaft. A nut 102 is threadedly mounted on the stub shaft and abuts the end of the boom so that the boom may be shifted along the stub shaft for a purpose more fully described hereinafter. The boom 100 has a guide sprocket 103 at its outer end and idler sprockets 104 and 105 which guide an endless cutter chain 106 which passes along the upper and lower sides of the boom. This chain is provided with cutters 107 spaced along the length thereof. The cutter chain is driven by a drive sprocket 108 keyed to the drive shaft 33 and located between the ends of sleeves 92 and 93 upon which the boom plates 90 and 91 are pivotally mounted.

A pair of propelling members 110 and 111 are fixed to a shaft 112 rotatably mounted in a pair of ears 113 and 114 depending from a collar 115 which is adjustably secured to the inner end of the boom by friction bolts 116 and 117. The propelling members 110 and 111 are positioned generally below and at opposite sides of the boom 100 so that when the boom is lowered in cutting a trench, as shown in FIG. 2, the propelling members function to receive the material elevated from the trench and form it into piles to prevent its returning into the trench as well as to throw it into the path of paddles referred to hereinafter.

A propeller drive sprocket 120 is keyed to the shaft 112 and the propeller drive sprocket is engaged by the cutter chain 106 to cause rotation thereof.

A paddle frame extends outwardly from each of the boom plates and comprises a rod 121 extending outwardly at an angle from the associated boom plate and secured thereto. The outer end of the rod is connected to a bar formed of parts 122 and 123 which are slidably adjustable with respect to each other and held in fixed relation by a friction bolt 124. An idler sprocket 125 is carried on the part 123 and a drive sprocket 126 is carried on the part 122. A paddle chain 127 passes around the sprockets and carries paddles 128 for carrying dirt outwardly away from the propelling members 110 and 111. Both of the paddle frame and chain mechanisms are identical so that similar reference numerals are used in connection with both of these units.

The drive for the drive sprockets 126 is obtained from a primary drive sprocket 130 which is keyed to a paddle drive shaft 131 extending through the upper forward ends of the boom plates 90 and 91 and rotatably mounted therein by collar and bearing units 132 and 133. The outer ends of the drive shaft 131 are connected to the drive sprockets 126 by a pair of universal joints 134 and 135. The primary drive sprocket 130 is positioned above the cutter chain 106 and is engaged on its underside by the cutter chain so as to receive power therefrom.

As shown in FIG. 1, the boom 100 is in an elevated position to enable movement of the machine between cutting positions and at the mobile rate obtained by use of the pin 80 (FIG. 9). The boom is shown in a lowered position in FIG. 2 and it will be appreciated that the angle of the boom with respect to the body of the machine may be less than that shown if a shallower trench is desired. The position of the boom with respect to the body of the machine is obtained by a handle 140 which is connected to a threaded shaft 141 secured against longitudinal movement in a frame 142 by collars 143 and 144. A collar 155 is threadably mounted on the shaft 141 and has ears 156 and pin 156a which confine therebetween a cross rod 157 extended between and secured to the rear ends of the boom plates 90 and 91. The frame 142 is pivotally mounted at its lower end on the cross brace 4 through which the axle 5 extends. Depending upon the direction of rotation of the handle, the boom will be either raised or lowered by pivoting of the boom plates 90 and 91 on the sleeves 92 and 93.

The endless cutter chain 106 has an added function of holding the boom 100 on the stub shaft 97 since the chain extends around the guide sprocket 103 on the free end of the boom and around the drive sprocket 108. The cutter chain may be maintained taut by working the nut 102 outwardly on the stub shaft which shifts the boom outwardly. One of the important features of this invention is that the boom may be readily removed from the machine by shifting the nut 102 towards the cross plate 96 to slack the chain 106 sufficiently so that it may be taken off the guide sprocket 103 which results in freeing the boom for release from the stub shaft. This feature also results in permitting different lengths of boom to be used with the machine depending upon the depth of trench that is to be made and only additionally requiring a suitable shortening of the cutter chain.

The removability of the boom along with removability of the handles 12 and 13 substantially reduces the overall length of the machine so that it may be transported from one location to another by placing it on a relatively small truck. The machine may be placed on the truck under its own power.

The boom 100 at its outer end adjacent the guide sprocket 103 has a rod 160 (FIG. 3) extending across the path of the chain to deflect rocks or other debris away from under the chain so that a rock lodged between the chain and the upper side of the boom will not be carried down toward the sprocket 103 and result in a jam between the chain and sprocket.

When in mobile position, the machine will travel toward the right looking at FIG. 1 and when cutting a trench, the machine will travel toward the right looking at FIG. 2 which is the opposite direction. Looking at FIG. 2, the propelling members 111 and 112 are rotated in a counterclockwise direction or, in a clockwise direction looking at FIG. 5 while the paddle members 128 nearest the ground will move away from the wheels 10. Because of the angular relation of the paddle chains 127 with respect to the boom plates, as shown in FIGS. 6 and 7, the paddles move laterally outwardly from the wheels.

The components of the machine are so arranged that with the boom 100 in its upper position as shown in FIG. 1, the machine is substantially balanced about the front axle 5. The wheels 10 on the front axle 5 are detachably connected thereto by pins, one of which is indicated at 165, which extend through hub 165a of the wheels 10 and an opening 165b formed in the end of the axle. Each pin is held in connecting position by a clip member 166 which substantially surrounds the wheel hub. As shown in FIG. 11, the wheels 10 on the rear axle 6 are secured thereto by pins 169 and held by cotter key 170.

With the machine balanced about the front axle 5, and the front wheels disengaged from their axle, the machine may be moved along at a mobile rate by the drive through the rear axle 6 and when it is desired to change the direction of movement of the machine, the rear wheels may be lifted off the ground and a turn easily made. A pair of collars 167 and 168 hold the wheels 10 on the front axle.

This application is a division of my prior application Ser. No. 548,838, filed November 25, 1955, now Patent No. 2,828,557.

I claim:

1. A manually operable trenching machine comprising, in combination, a body having wheels, a boom mounted on the body for up and down movement, a chain and a drive sprocket for driving the wheels, a ratchet wheel operatively connected to said sprocket, an oscillating pawl carrier adjacent the ratchet wheel and having a drive pawl, a hold pawl movably mounted to engage the ratchet wheel, a manually operable control member pivotally mounted on the body for movement between a plurality of positions and having arms engageable with said pawls to permit both pawls to engage the ratchet wheel to obtain a trenching rate of movement or only the hold pawl to engage the ratchet wheel when lowering the boom into the ground, or to hold both pawls away from the ratchet wheel.

2. A trenching machine as defined in claim 1 including, a second drive pawl drivingly engageable with the ratchet wheel on the idle stroke of said first-recited drive pawl to increase the trenching rate of movement, and another arm on said control member for controlling the position of said second drive pawl.

3. A portable trenching machine comprising, in combination, a body, front and rear axles having wheels, a power source, drive means for alternately driving said axles from said power source at a mobile rate or a trenching rate including a removable pin for determining at which rate the axles may be driven, and removable means for disengaging the wheels on one of said axles from driving relation therewith to enable them to free wheel so as to increase the turnability of the machine.

4. A portable trenching machine comprising, in combination, a body having front and rear axles and wheels thereon, a cutter chain boom extending from one end of the body, handles extending from the other end of the body, a motor on said body, a selectivity operable first drive mechanism powered by the motor for driving the axles at a trenching rate of speed in a trenching direction with the boom trailing the body, a selectively operable second drive mechanism powered by the motor for driving the axles at a mobile rate of speed in a mobile direction with the boom ahead of the body and the handles trailing the body whereby to facilitate guiding of the machine, and selectively operable means for determining which of said first and second drive mechanisms is operable to drive the axles.

5. A portable trenching machine comprising, in combination, a body having an axle and wheels thereon, a cutter chain boom extending from one end of the body, a handle extending from the other end of the body, a motor on said body, a selectively operable first drive mechanism powered by the motor for driving the axle at a trenching rate of speed in a trenching direction with the boom trailing the body, a selectively operable second drive mechanism powered by the motor for driving the axle at a mobile rate of speed in a mobile direction with the boom ahead of the body and the handle trailing the body whereby to facilitate guiding of the machine, and selectively operable means for determining which of said first and second drive mechanisms is operable to drive the axle.

6. A portable trenching machine comprising, in combination, a body having axles and ground engaging means thereon including at least one front wheel and at least one rear wheel, a cutter chain boom extending from adjacent an end of the body, a handle extending from adjacent the other end of the body, a motor on said body, drive means powered by the motor for either having the axles at a trenching rate of speed in a trenching direction with the boom trailing the body or for alternatively driving the axles at a mobile rate of speed in a mobile direction with the boom ahead of body and the handles trailing the body whereby to facilitate guiding of the machine, and selectively operable means for controlling said drive means, said machine being balanced about one of said axles whereby the machine may be easily tilted by force applied to the handle to lessen the number of wheels engaging the ground and improve steerability thereof.

7. A portable trenching machine comprising, in combination, a body having an axle and wheels thereon, a cutter chain boom extending from one end of the body, a handle extending from the other end of the body, a motor on said body, a selectively operable first drive mechanism powered by the motor including pawl and ratchet means for driving the axle at a trenching rate of speed in a trenching direction with the boom trailing the body, a selectively operable second drive mechanism powered by the motor and bypassing the pawl and ratchet means for driving the axle at a mole rate of speed in a mobile direction with the boom ahead of the body and the handle trailing the body whereby to facilitate guiding of the machine, and selectively operable means for determining which of said first and second drive mechanisms is operable to drive the axle.

8. A portable trenching machine comphising, in combination, a body, front and rear axles each having at least one wheel, a power source, drive means for said axles for driving said machine at a mobile rate or a trenchiing rate, a cutter chain boom extending from adjacent an end of the body, a handle extending from adjacent the other end of the body, said machine being generally balanced about the axle nearest said boom, and means for disengaging the last mentioned axle from driving relation with the wheels thereon to enable the wheels to free wheel for steering of the machine by lifting of the wheel on the other axle from the axle from the ground as facilitiated by the balance of the machine.

References Cited in the file of this patent

UNITED STATES PATENTS

| | | |
|---|---|---|
| 824,740 | Poulson | July 3, 1906 |
| 1,306,350 | McIntire | June 10, 1919 |
| 1,306,351 | McIntire | June 10, 1919 |
| 1,484,841 | Monahan et al. | Feb. 26, 1924 |
| 1,545,805 | White | July 14, 1925 |
| 2,519,075 | Schmidt | Aug. 15, 1950 |
| 2,556,939 | Povinelli | June 12, 1951 |
| 2,714,262 | Malzahn | Aug. 2, 1955 |
| 2,714,934 | Cassady | Aug. 9, 1955 |
| 2,751,698 | Brown | June 26, 1956 |
| 2,776,533 | Yacoby | Jan. 8, 1959 |

FOREIGN PATENTS

| | | |
|---|---|---|
| 257,770 | Italy | Mar. 17, 1928 |

UNITED STATES PATENT OFFICE
CERTIFICATE OF CORRECTION

Patent No. 2,990,631                              July 4, 1961

William Delbert Brown

It is hereby certified that error appears in the above numbered patent requiring correction and that the said Letters Patent should read as corrected below.

Column 6, line 58, for "having" read -- driving --; column 8, line 2, strike out "from the axle".

Signed and sealed this 28th day of November 1961.

(SEAL)
Attest:

ERNEST W. SWIDER                           DAVID L. LADD
Attesting Officer                             Commissioner of Patents

USCOMM-DC